(12) United States Patent
Tomiya et al.

(10) Patent No.: US 11,752,747 B2
(45) Date of Patent: Sep. 12, 2023

(54) SEALANT FILM, LAMINATE FILM, AND PACKAGING MATERIAL

(71) Applicant: DIC Corporation, Tokyo (JP)

(72) Inventors: Daiki Tomiya, Kitaadachi-gun (JP); Yuki Kaburagi, Kitaadachi-gun (JP); Takashi Moriya, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 18/068,577

(22) Filed: Dec. 20, 2022

(65) Prior Publication Data

US 2023/0234346 A1    Jul. 27, 2023

(30) Foreign Application Priority Data

Jan. 27, 2022    (JP) .................................. 2022-010802

(51) Int. Cl.
| | |
|---|---|
| *B32B 27/32* | (2006.01) |
| *B32B 7/12* | (2006.01) |
| *B32B 27/08* | (2006.01) |
| *B32B 37/12* | (2006.01) |

(52) U.S. Cl.
CPC .............. *B32B 27/32* (2013.01); *B32B 7/12* (2013.01); *B32B 27/08* (2013.01); *B32B 37/1207* (2013.01); *B32B 2037/1223* (2013.01); *B32B 2250/03* (2013.01); *B32B 2250/24* (2013.01); *B32B 2274/00* (2013.01); *B32B 2307/31* (2013.01); *B32B 2307/702* (2013.01); *B32B 2323/00* (2013.01)

(58) Field of Classification Search
CPC ........... B32B 27/32; B32B 7/12; B32B 27/08; B32B 37/1207; B32B 2037/1223; B32B 2250/03; B32B 2250/24; B32B 2274/00; B32B 2307/31; B32B 2307/702; B32B 2323/00

See application file for complete search history.

(56) References Cited

U.S. PATENT DOCUMENTS 5,882,749 A * 3/1999 Jones ................. B65D 77/2096
428/34.8

FOREIGN PATENT DOCUMENTS

| | | |
|---|---|---|
| JP | 2005-119075 A | 5/2005 |
| JP | 2016-43964 A | 4/2016 |

* cited by examiner

*Primary Examiner* — Michael C Miggins
(74) *Attorney, Agent, or Firm* — WHDA, LLP

(57) ABSTRACT

A sealant film is provided in which a surface resin layer (A), an adhesive resin layer (B), a release resin layer (C), and a heat seal resin layer (D) are laminated. The adhesive resin layer (B) contains a thermoplastic elastomer (b1) and a tackifier resin (b2). The release resin layer (C) contains 40% by mass or more of an ethylene ionomer (c1) with a polar group concentration exceeding 5.5 mol % in a resin component contained in the release resin layer (C). The release resin layer (C) further contains 0 to 60% by mass of an ethylene ionomer (c2) with a polar group concentration of 5.5 mol % or less in the resin component contained in the release resin layer (C). The heat seal resin layer (D) contains an ethylene resin (d1).

10 Claims, No Drawings

SEALANT FILM, LAMINATE FILM, AND PACKAGING MATERIAL

BACKGROUND OF THE INVENTION

1. Field of the Invention

The present invention relates to a sealant film that has satisfactory adhesion to adherends such as heat seal portions of packaging containers, can be suitably peeled off, and can be sealed again after peeling, and to a laminate film and a packaging material.

2. Description of the Related Art

Packaging materials with easy-peel films, with which the packaging materials can be easily opened, are widely used as packaging materials for various food products and medical supplies. Packaging materials with easy-peel films are required to have resealability that enables easy resealing after opening, for the purpose of preserving the remaining contents.

As resealable films, for example, a multilayer film in which an adhesive resin layer containing an amorphous olefin resin and a heat seal resin layer containing a thermoplastic resin are laminated is disclosed. See Japanese Unexamined Patent Application Publication No. 2005-119075.

Also, a multilayer film in which an adhesive resin layer mainly composed of a styrene elastomer is laminated on a release resin layer containing an amide resin is disclosed. See Japanese Unexamined Patent Application Publication No. 2016-043964.

SUMMARY OF THE INVENTION

The above multilayer films have a specific structure of laminated resin layers and thereby achieve resealability that enables sealing again after opening. However, if the seal strength after resealing is not sufficient, the remaining contents may fail to be sufficiently preserved or the contents may drop out or the like. It is therefore desired to further improve the seal strength after resealing.

When the film structure is adjusted to improve the seal strength after resealing, the initial peel strength may be increased to deteriorate easy open ability, or the seal surface may fail to be exposed well to prevent desired resealability.

An object of the present invention is to provide a laminate film that has suitable heat sealability to films or adherends and easy open ability and that can be suitably resealed after opening.

To achieve the object above, the present invention provides a sealant film in which a surface resin layer (A), an adhesive resin layer (B), a release resin layer (C), and a heat seal resin layer (D) are laminated, in which
  the adhesive resin layer (B) contains a thermoplastic elastomer (b1) and a tackifier resin (b2),
  the release resin layer (C) contains 40% by mass or more of an ethylene ionomer (c1) with a polar group concentration exceeding 5.5 mol % in a resin component contained in the release resin layer (C),
  the release resin layer (C) further contains 0 to 60% by mass of an ethylene ionomer (c2) with a polar group concentration of 5.5 mol % or less in the resin component contained in the release resin layer (C), and
  the heat seal resin layer (D) contains an ethylene resin (d1).

The present invention also provides a laminate film including the sealant film described above.

The present invention also provides a packaging material including the sealant film described above.

The sealant film of the present invention can be suitably used for packaging various food products, medical supplies, and the like, because it has suitable heat sealability and easy open ability, can be resealed with excellent seal strength after opening, and can suitably protect the remaining contents even after opening.

DETAILED DESCRIPTION OF EMBODIMENTS

A sealant film of the present invention is a sealant film in which a surface resin layer (A), an adhesive resin layer (B), a release resin layer (C), and a heat seal resin layer (D) are laminated. The adhesive resin layer (B) is a layer containing a thermoplastic elastomer (b1) and a tackifier resin (b2). The release resin layer (C) is a layer containing 40% by mass or more of an ethylene ionomer (c1) with a polar group concentration exceeding 5.5 mol % in a resin component contained in the release resin layer (C) and 0 to 60% by mass of an ethylene ionomer (c2) with a polar group concentration of 5.5 mol % or less in the resin component contained in the release resin layer (C). The heat seal resin layer (D) contains an ethylene resin (d1).

The heat seal resin layer (D) further contains 0 to 80% by mass of a thermoplastic elastomer (d2) in a resin component contained in the heat seal resin layer (D), and the percentage of the ethylene ionomer (c2) and the thermoplastic elastomer (d2) contained in the sealant film is 10 to 60% as expressed by the following formula.

$$[((Wc2/Wct) \times 100) + ((Wd2/Wdt) \times 100)]/2$$

Wct: the total amount (mass) of the resin component contained in the release resin layer (C)

Wc2: the amount (mass) of the ethylene ionomer (c2) with a polar group concentration of 5.5 mol % or less in the resin component contained in the release resin layer (C)

Wdt: the total amount (mass) of the resin component contained in the heat seal resin layer (D)

Wd2: the amount (mass) of the thermoplastic elastomer (d2) in the resin component contained in the heat seal resin layer (D)

Surface Resin Layer (A)

The surface resin layer (A) used in the present invention is a layer that forms the other surface opposite to the heat seal resin layer (D) in the sealant film. Various resins used for sealant films can be used as a resin used for the surface resin layer (A), but olefin resins are preferably used as the main resin component because the adhesion to other layers can be easily achieved. When an olefin resin is used for the surface resin layer (A), the amount of the olefin resin is preferably 80% by mass or more of the resin component contained in the surface resin layer (A), and more preferably 90% by mass or more. It is also preferable that the resin component used includes only an olefin resin.

For example, ethylene resins, propylene resins, and butylene resins can be used as the olefin resin used for the surface resin layer (A) used in the present invention. Among those, it is preferable that an ethylene resin is used as the main resin component. When an ethylene resin is used as the main resin component, the amount of the ethylene resin in the olefin resin used in the surface resin layer (A) is preferably 50% by mass or more, more preferably 70% by mass or more, and even more preferably 90% by mass or more. It is also preferable that the olefin resin used includes only an ethylene resin.

Examples of the ethylene resin include polyethylene resins such as very low density polyethylene (VLDPE), low density polyethylene (LDPE), linear low density polyethylene (LLDPE), linear medium density polyethylene (LMDPE), and medium density polyethylene (MDPE), ethylene copolymers such as ethylene-vinyl acetate copolymers (EVA), ethylene-methyl methacrylate copolymers (EMMA), ethylene-ethyl acrylate copolymers (EEA), ethylene-methyl acrylate copolymers (EMA), ethylene-ethyl acrylate-maleic anhydride copolymers (E-EA-MAH), ethylene-acrylic acid copolymers (EAA), and ethylene-methacrylic acid copolymers (EMAA), and ionomers of ethylene-acrylic acid copolymers, ionomers of ethylene-methacrylic acid copolymers, and polyethylene elastomers.

The ethylene resins may be used singly or in a combination of two or more. Among the ethylene resins, very low density polyethylene, low density polyethylene, linear low density polyethylene, and linear medium density polyethylene can be preferably used, because suitable shock resistance can be easily achieved, and linear low density polyethylene can be particularly preferably used.

The density of the ethylene resin is preferably 0.950 g/cm$^3$ or less and more preferably 0.940 g/cm$^3$ or less, because if so, satisfactory shock resistance can be easily achieved. The density of the ethylene resin is preferably 0.900 g/cm$^3$ or more and more preferably 0.910 g/cm$^3$ or more.

The melt flow rate (MFR) of the ethylene resin is 0.5 to 50 g/10 min (190° C., 21.18 N), preferably 1 to 30 g/10 min (190° C., 21.18 N), and more preferably 2 to 20 g/10 min (190° C., 21.18 N). It is preferable that the MFR is in this range in terms of achieving satisfactory film-forming properties.

Examples of the propylene resin that can be used include propylene homopolymers, and propylene-α-olefin random copolymers and propylene-α-olefin block copolymers such as propylene-ethylene copolymers, propylene-butene-1 copolymers, and propylene-ethylene-butene-1 copolymers. When an olefin resin other than ethylene resins, such as a propylene resin, is used, the amount of the propylene resin is preferably 50% or less, more preferably 30% or less, and even more preferably 10% or less of the olefin resin used in the surface resin layer (A).

Resins other than those listed above may be used in combination in the surface resin layer (A) used in the present invention. Examples of the other resins include thermoplastic elastomers such as polypropylene elastomers, butene elastomers, and styrene elastomers.

When the other resins are used, the amount of the other resins is preferably 20% by mass or less and more preferably 10% by mass or less of the resin component contained in the surface resin layer (A).

In the surface resin layer (A) used in the present invention, various additives may be used in combination as appropriate in addition to the above resin component. The additives that can be used as appropriate include, for example, a lubricant, an antiblocking agent, a UV absorber, a photostabilizer, an antistatic agent, an antifogging agent, and a colorant. When the additives are used, they are used preferably in the amount of 10 parts by mass or less, more preferably 5 parts by mass or less, and even more preferably about 0.01 to 3 parts by mass per 100 parts by mass of the resin component used in the surface resin layer (A).

In particular, since the coefficient of friction of the surface resin layer (A) used in the present invention is preferably 0.9 or less, and particularly preferably 0.8 or less, in order to impart processing suitability during film forming and packaging suitability in filling machines, it is also preferable to add a lubricant and an antiblocking agent to the surface resin layer (A) as appropriate.

The thickness ratio of the surface resin layer (A) used in the present invention to the total thickness of the sealant film is preferably in a range of 20 to 70%, and more preferably in a range of 30 to 60%, because if so, suitable shock resistance can be easily achieved.

Adhesive Resin Layer (B)

The adhesive resin layer (B) used in the present invention is a resin layer containing a thermoplastic elastomer (b1) and a tackifier resin (b2), and contributes to resealing by adhesion when the sealant film of the present invention or a film including the sealant film in its structure is peeled (opened) after heat sealing. A preferred manner of peeling and resealing is such that the film is peeled at the interface between the adhesive resin layer (B) and the release resin layer (C) used in the present invention, and the peeled adhesive resin layer (B) is brought into contact with the release resin layer (C) again and pressed as necessary to be resealed. In peeling at the adhesive resin layer (B)/release resin layer (C) interface, a portion of the adhesive resin layer (B) may remain on a surface of the release resin layer (C), or a portion of the release resin layer (C) may remain on a surface of the adhesive resin layer (B), but the percentage of the exposed portion of the adhesive resin layer (B) on the surface of the adhesive resin layer (B) after peeling is preferably 60% or more, more preferably 70% or more, and even more preferably 80% or more in the area of the peeled portion. When the percentage of the exposed portion of the adhesive resin layer (B) in the peeled surface falls within this range, suitable resealability can be easily achieved.

Examples of the thermoplastic elastomer (b1) that can be used in the adhesive resin layer (B) used in the present invention include thermoplastic elastomers such as ethylene elastomers, propylene elastomers, and butene elastomers, and styrene elastomers. Among those, ethylene elastomers can be preferably used because they are inexpensive and easily achieve suitable easy peelability and resealability. Styrene elastomers are also preferably used because they can easily achieve particularly excellent easy peelability and resealability.

The ethylene elastomers are thermoplastic elastomers containing ethylene as a monomer component and are elastomers containing ethylene as a monomer component in the amount of 50 mol % or more, preferably 50 to 90 mol %, and more preferably about 60 to 85 mol % of the total monomer component. Examples of monomers that can copolymerize with ethylene include α-olefins other than ethylene, such as propylene, butene-1, hexene-1, 4-methylpentene-1, octene-1, (meth)acrylic esters, and vinyl acetate. Among those, random copolymers with α-olefins can be preferably used, and copolymers with α-olefins with 3 to 8 carbon atoms are particularly preferred.

The density of the ethylene elastomer is preferably in a range of 0.870 to 0.943 g/cm$^3$ and more preferably in a range of 0.870 to 0.910 g/cm$^3$, because if so, satisfactory adhesiveness can be achieved in resealing.

The melt flow rate (MFR) of the ethylene elastomer is preferably 0.5 to 20 g/10 min (190° C., 21.18 N) and more preferably 2 to 15 g/10 min (190° C., 21.18 N) because if so, the flowability is easily matched to that of the other resin layers.

Examples of the styrene elastomers include A-B-A type block polymers such as styrene-butadiene-styrene (SBS), styrene-isoprene-styrene (SIS), styrene-ethylene-butylene copolymer-styrene (SEBS), styrene-ethylene-propylene-styrene (SEPS), and styrene-butadiene-butylene-styrene (SBBS); A-B block polymers such as styrene-butadiene (SB), styrene-isoprene (SI), styrene-ethylene-butylene copolymers (SEB), and styrene-ethylene-propylene copolymers (SEP); styrene random copolymers such as styrene butadiene rubber (SBR); A-B-C type styrene-crystalline olefin block polymers such as styrene-ethylene-butylene copolymer-crystalline olefin (SEBC); and hydrogenated products thereof. Among those, styrene-butadiene-butylene-styrene (SBBS) is preferred because particularly suitable easy peelability and resealability can be easily achieved.

The density of the styrene elastomer is preferably in a range of 0.92 to 1.1 g/cm$^3$, and more preferably in a range of 0.92 to 1.0 g/cm$^3$ to contribute to improvement in adhesiveness to the release resin layer.

The melt flow rate (MFR) of the styrene elastomer is preferably 0.5 to 20 g/10 min (190° C., 21.18 N), and more preferably 2 to 15 g/10 min (190° C., 21.18 N), because if so, the flowability is easily matched to that of the other resin layers.

The amount of the thermoplastic elastomer (b1) in the adhesive resin layer (B) used in the present invention is preferably 10 to 60% by mass of the resin component contained in the adhesive resin layer (B), more preferably 15 to 55% by mass, and even more preferably 20 to 50% by mass. When the amount of the thermoplastic elastomer (b1) falls within this range, it is easy to achieve suitable cohesion and easy peelability at the time of peeling, as well as satisfactory adhesion at the time of resealing.

Examples of the tackifier resin (b2) used in the adhesive resin layer (B) used in the present invention include resins having tackiness at room temperature and made of natural resins or synthetic resins. Examples thereof include rosin resins such as rosin natural resins, polymerized rosins, hydrogenated rosins, rosin glycerin ester, and pentaerythritol; terpene resins such as terpene, aromatic modified terpene, terpene phenol, and hydrogenated terpene; petroleum resins such as aliphatic petroleum resins, aromatic petroleum resins, and hydrogenated alicyclic petroleum resins; liquid polybutadiene at room temperature, liquid polyisoprene at room temperature, and liquid polyisobutylene at room temperature. Among those, rosin resins, terpene resins, and petroleum resins are preferred because easy peelability and resealability can be easily adjusted.

The amount of the tackifier resin (b2) in the adhesive resin layer (B) used in the present invention is preferably 40 to 90% by mass of the resin component contained in the adhesive resin layer (B), more preferably 45 to 85% by mass, and even more preferably 50 to 80% by mass. When the amount of the tackifier resin (b2) falls within this range, it is easy to achieve suitable cohesion and easy peelability at the time of peeling, as well as satisfactory adhesion at the time of resealing.

Resins other than the thermoplastic elastomer (b1) and the tackifier resin (b2) may be used in combination in the adhesive resin layer (B) used in the present invention. As the other resins, for example, the olefin resins exemplified in the surface resin layer (A) can be suitably used.

The amount of the other resins in the adhesive resin layer (B) used in the present invention is preferably 30% by mass or less of the resin component contained in the adhesive resin layer (B), more preferably 20% by mass or less, and even more preferably 5 to 15% by mass. Within this range, it is easy to impart the characteristics of the resin added while keeping suitable easy peelability and resealability.

Additives such as those exemplified in the surface resin layer (A) may be used as appropriate in the adhesive resin layer (B). The preferred amount used is also the same as in the surface resin layer (A).

The thickness ratio of the adhesive resin layer (B) used in the present invention to the total thickness of the sealant film is preferably 10 to 60%, and more preferably in a range of 20 to 50%, because if so, suitable seal strength after resealing can be easily achieved.

Release Resin Layer (C)

The release resin layer (C) used in the present invention is a layer containing 40% by mass or more of an ethylene ionomer (c1) with a polar group concentration exceeding 5.5 mol % in the resin component contained in the release resin layer (C). The release resin layer (C) allows peeling at the adhesive resin layer (B)/release resin layer (C) interlayer to expose the adhesive resin layer (B) when the sealant film of the present invention or a film including the sealant film in its structure is stripped off and peeled (opened) after heat sealing. The release resin layer (C) is therefore required to have adhesion to the heat seal layer (D) in addition to the peelability from the adhesive resin layer (B). The release resin layer (C) adheres to the adhesive resin layer (B) at the time of resealing.

The polar group concentration of the ethylene ionomer (c1) with a polar group concentration exceeding 5.5 mol % (the ionomer may hereinafter be referred to as a high polar ionomer) used in the release resin layer (C) used in the present invention is preferably 5.8 mol % or more, more preferably 6 mol % or more, and even more preferably 6.5 mol % or more. The polar group concentration of the ethylene ionomer (c1) is preferably 15 mol % or less, more preferably 12 mol % or less, and even more preferably 10 mol % or less. With this polar group concentration, the effects such as suitable seal strength after resealing can be easily achieved.

The polar group concentration is determined by placing a resin pellet (0.025 g) in an NMR tube, adding 0.5 cc of a mixture of benzene-d6 (C6D6)/o-dichlorobenzene (ODCB)=⅓ (V/V), dissolving the pellet by heating at 125° C. for 2 days with a drier, then performing H-NMR measurement under a heating condition of 130° C., and calculating the polar group concentration based on the signal intensity of the ethylene chain and the methyl group of methacrylic acid.

Examples of the polar group include acrylic acid, methacrylic acid, 2-ethyl acrylic acid, crotonic acid, maleic acid, fumaric acid, itaconic acid, maleic anhydride, fumaric anhydride, itaconic anhydride, monomethyl maleate, and monoethyl maleate. In particular, acrylic acid or methacrylic acid is preferred.

For example, ethylene-acrylic acid copolymers (EAA) and ethylene-methacrylic acid copolymers (EMAA) can be used as the high polar ionomer (c1), and metal-neutralized ethylene-acrylic acid copolymers and metal-neutralized ethylene-methacrylic acid copolymers can be preferably used.

The melt flow rate (MFR) of the high polar ionomer (c1) is preferably 0.5 to 20 g/10 min (190° C., 21.18 N) and more preferably 2 to 17/10 min (190° C., 21.18 N) because if so, the flowability is easily matched to that of the other resin layers.

When the amount of the high polar ionomer (c1) in the release resin layer (C) used in the present invention is 40% by mass or more of the resin component contained in the release resin layer (C), dropping of the release resin layer (C) and peeling at the release resin layer (C)/heat seal layer (D) interface at the time of peeling can be suppressed, and suitable easy peelability at the adhesive resin layer (B)/release resin layer (C) interface can be achieved. The above amount is preferably 50 to 100% by mass, more preferably 60 to 100% by mass, and even more preferably 60 to 85% by mass.

In the release resin layer (C) used in the present invention, it is also preferable that an ethylene ionomer (c2) with a polar group concentration of 5.5 mol % or less (the ionomer may hereinafter be referred to as a low polar ionomer) is used in combination with the high polar ionomer (c1). When the low polar ionomer (c2) is used in combination, the effects such as improvement in adhesion between the release resin layer (C) and the heat seal resin layer (D) can be easily achieved.

The polar group concentration of the low polar ionomer (c2) is preferably 5.5 mol % or less, more preferably 5.2 mol % or less, and even more preferably 5 mol % or less. The polar group concentration of the low polar ionomer (c2) is preferably 1 mol % or more, more preferably 2 mol % or more, and even more preferably 3 mol % or more. With this polar group concentration, the effects such as development of suitable seal strength after resealing can be easily achieved. The method of determining the polar group concentration is the same as the method of determining the polar group concentration of the high polar ionomer described above.

For example, ethylene-acrylic acid copolymers (EAA) and ethylene-methacrylic acid copolymers (EMAA) can be used as the low polar ionomer (c2), and metal-neutralized ethylene-acrylic acid copolymers and metal-neutralized ethylene-methacrylic acid copolymers can be preferably used.

The melt flow rate (MFR) of the low polar ionomer is preferably 0.5 to 20 g/10 min (190° C., 21.18 N) and more preferably 2 to 17 g/10 min (190° C., 21.18 N) because if so, the flowability is easily matched to that of the other resin layers.

When the low polar ionomer (c2) is used, suitable seal strength after resealing can be easily achieved by setting the amount of the low polar ionomer (c2) in the release resin layer (C) to 60% by mass or less of the resin component contained in the release resin layer (C). The amount is preferably 55% by mass or less, more preferably 50% by mass or less, and even more preferably 40% by mass or less.

In the release resin layer (C) used in the present invention, for example, the olefin resins or the like exemplified in the surface resin layer (A) may be used as resins other than the high polar ionomer (c1) and the low polar ionomer (c2). When the other resins are used, the amount of the other resins is preferably 20% by mass or less of the resin component contained in the release resin layer (C), more preferably 10% by mass, and even more preferably 5 to 10% by mass. Within this range, it is easy to impart the characteristics of the resin added while keeping suitable easy peelability and resealability.

Additives such as those exemplified in the surface resin layer (A) may be used as appropriate in the release resin layer (C). The preferred amount used is also the same as in the surface resin layer (A).

The thickness ratio of the release resin layer (C) used in the present invention to the total thickness of the sealant film is preferably 20% or less, and more preferably in a range of 5 to 15%, because if so, suitable peelability can be easily achieved.

Heat Seal Resin Layer (D)

The heat seal resin layer (D) used in the present invention is a resin layer containing an ethylene resin (d1). With the use of the heat seal resin layer (D), suitable interlayer adhesion that suppresses dropping of the release resin layer (C) even at the time of peeling can be achieved while achieving suitable heat sealability to the adherend.

Examples of the ethylene resin (d1) used in the heat seal resin layer (D) used in the present invention include polyethylene resins such as very low density polyethylene (VLDPE), low density polyethylene (LDPE), linear low density polyethylene (LLDPE), linear medium density polyethylene (LMDPE), and medium density polyethylene (MDPE), and ethylene copolymers such as ethylene-vinyl acetate copolymers (EVA), ethylene-methyl methacrylate copolymers (EMMA), ethylene-ethyl acrylate copolymers (EEA), ethylene-methyl acrylate copolymers (EMA), ethylene-ethyl acrylate-maleic anhydride copolymers (E-EA-MAH), ethylene-acrylic acid copolymers (EAA), and ethylene-methacrylic acid copolymers (EMAA). The ethylene resins may be used singly or in combination of two or more. Among the ethylene resins, very low density polyethylene, low density polyethylene, linear low density polyethylene, and linear medium density polyethylene can be preferably used, because suitable shock resistance can be easily achieved, and low density polyethylene can be particularly preferably used.

The melt flow rate of the ethylene resin is preferably 0.5 to 45 g/10 min at 190° C. and more preferably 2 to 40 g/10 min. When the melt flow rate falls within this range, adhesiveness between a container and a lid and stable seal strength can be easily achieved.

The amount of the ethylene resin (d1) is preferably 10 to 100% by mass or more and more preferably 20 to 100% by mass of the resin component contained in the heat seal resin layer (D). When a plurality of ethylene resins (d1) are used in combination, it is preferable that the total amount thereof is in the range above.

In the heat seal resin layer (D) used in the present invention, it is also preferable that a thermoplastic elastomer (d2) is used in combination with the ethylene resin (d1). Examples of the thermoplastic elastomer (d2) are the same as those of the thermoplastic elastomer (b1) exemplified in the adhesive resin layer (B). Among those, ethylene elastomers can be preferably used.

When the amount of the thermoplastic elastomer (d2) is 0 to 80% by mass of the resin component contained in the heat seal resin layer (D), suitable resealability can be easily achieved. The amount is preferably 0 to 70% by mass and more preferably 0 to 60% by mass.

In the heat seal resin layer (D) used in the present invention, for example, the resins exemplified as the other resins in the surface resin layer (A) may be used as resins other than the ethylene resin (d1) and the thermoplastic elastomer (d2). When the other resins are used, it is preferable that the amount of the other resins is preferably 20% or less of the resin component contained in the heat seal resin layer (D), more preferably 10% by mass, and even more preferably 5 to 10% by mass. Within this range, it is easy to impart the characteristics of the resin added while keeping suitable sealability and easy peelability.

In the heat seal resin layer (D), it is also preferable to emboss the heat-sealed surface of the heat seal resin layer (D) or add a filler to the heat seal resin layer (D) in order to suppress deterioration of slippage or blocking caused by the bleeding of low molecular weight components from the other layers. Inorganic materials such as calcium carbonate and talc are preferred as the filler because they are inexpensive, facilitate formation of surface roughness, and retain a satisfactory coefficient of friction.

The amount of the filler is preferably 0.1 to 15 parts by mass and more preferably 1 to 10 parts by mass per 100 parts by mass of the resin component contained in the heat seal resin layer (D).

Additives such as those exemplified in the surface resin layer (A) may be used as appropriate, in addition to the filler. The preferred amount used is also the same as in the surface resin layer (A).

In the configuration of the present invention, peeling after heat sealing is between the adhesive resin layer (B) and the release resin layer (C). Therefore, even when additives such as a filler, a lubricant, and an antiblocking agent are added to the heat seal resin layer (D), the adhesion at the time of resealing is easily ensured, and a multilayer film with stable resealing strength can be made.

The thickness ratio of the heat seal resin layer (D) to the total thickness of the sealant film is preferably 20% or less, and more preferably in a range of 5 to 15%, because if so, suitable seal strength and peelability can be easily achieved.

Sealant Film

The sealant film of the present invention includes the surface resin layer (A), the adhesive resin layer (B), the release resin layer (C), and the heat seal resin layer (D). In the sealant film of the present invention, the release resin layer (C) may contain 60% by mass or less of the low polar ionomer (c2), and the heat seal resin layer (D) may contain 80% by mass or less of the thermoplastic elastomer (d2), where the low polar ionomer (c2) and/or the thermoplastic elastomer (d2) are contained in the respective layers so that the percentage of the low polar ionomer (c2) and the thermoplastic elastomer (d2) as expressed by the following formula is 10 to 60%.

$$[((Wc2/Wct) \times 100) + ((Wd2/Wdt) \times 100)]/2$$

Wct: the total amount (mass) of the resin component contained in the release resin layer (C)

Wc2: the amount (mass) of the ethylene ionomer (c2) with a polar group concentration of 5.5 mol % or less in the resin component contained in the release resin layer (C)

Wdt: the total amount (mass) of the resin component contained in the heat seal resin layer (D)

Wd2: the amount (mass) of the thermoplastic elastomer (d2) in the resin component contained in the heat seal resin layer (D)

When the percentage of the low polar ionomer (c2) and the thermoplastic elastomer (d2) represented by the above formula falls within the above range, the interlayer strength of the release resin layer (C)/heat seal resin layer (D) can be enhanced without impairing heat sealability. As a result, the exposure of the adhesive layer can be suitably adjusted, and satisfactory heat sealability, easy open ability, and resealability can be achieved.

The percentage of the low polar ionomer (c2) and the thermoplastic elastomer (d2) is preferably 10 to 50% and more preferably 10 to 40%. When the percentage of the low polar ionomer (c2) and the thermoplastic elastomer (d2) falls within this range, particularly suitable easy peelability and resealability can be easily achieved.

In the sealant film of the present invention, the total thickness of the film is preferably 10 to 100 μm, more preferably 20 to 60 μm, and even more preferably 30 to 50 μm. When the total thickness of the film is within this range, stable seal strength, suitability for packaging machines, excellent pinhole resistance, and easy open ability can be easily achieved.

The thickness of each layer is adjusted as appropriate within the range of the thickness ratio of each layer exemplified above. For example, the thickness of the surface resin layer (A) is preferably 6 to 70 μm and more preferably 9 to 60 μm. The thickness of the adhesive resin layer (B) is preferably 3 to 60 μm and more preferably 6 to 50 μm. The thickness of the release resin layer (C) is preferably 1 to 15 μm and more preferably 2 to 10 μm. The thickness of the heat seal resin layer (D) is preferably 1 to 15 μm and more preferably 2 to 10 μm.

When the sealant film of the present invention is heat-sealed with a polyethylene sheet, the initial seal strength obtained when the sealant film is first peeled off from the polyethylene sheet is preferably 5 N/15 mm or more, and more preferably 7 N/15 mm or more, in terms of protecting the contents. The seal strength is the maximum strength when the sealant film is peeled off in the 180° direction at a speed of 300 mm/min after heat-sealed at 180° C. and 0.2 MPa for 1 second with a seal width of 1 cm.

The initial seal strength of the sealant film of the present invention is preferably 20 N/15 mm or less, and more preferably 15 N/15 mm or less, because if so, suitable easy open ability can be easily achieved.

As the seal strength, it is preferable that the seal strength obtained when the sealant film is heat-sealed in a temperature range of 120 to 150° C. is in the range above, because if so, seal stability at the time of heat sealing can be easily achieved.

The sealant film of the present invention can be resealed once peeled off under the above conditions. The seal strength after resealing is preferably 2 N/15 mm or more, and more preferably 3 N/15 mm or more. When the seal strength after resealing falls within this range, satisfactory adhesiveness can be achieved, and separation can be suitably suppressed when shock is applied after resealing.

The seal strength after resealing is the maximum strength when the peeled surfaces once peeled after heat sealing are joined and pressed together at 23° C. and 0.2 MPa for 1 second, then left as they are in a thermostatic chamber at 23° C. and 50% RH for 5 minutes, and then peeled off in the 180° direction at a speed of 300 ram/min after 5 minutes of leaving. Although the upper limit is not limited, the seal strength after resealing is preferably 9 N/15 mm or less, and more preferably 7 N/15 mm or less.

In the sealant film of the present invention, the exposure state of the adhesive resin layer (B) on the peeled surface after peeling is preferably 50% or more, and more preferably 80% or more. When the percentage of the exposed surface of the adhesive resin layer (B) on the peeled surface is within this range, stable adhesiveness at the time of resealing can be easily achieved, and separation and opening due to external shocks after resealing can be suitably suppressed. The percentage of exposure can be evaluated, for example, by conducting photographic observation of the peeled surface and observing the percentage of the exposed surface in any 1 cm square area at about five points.

Cloudiness of the sealant film of the present invention is preferably 30% or less, more preferably 25% or less, and even more preferably 20% or less, because if so, the packaged contents are visible.

The method of producing the sealant film of the present invention is not limited. For example, a coextrusion process may be employed, in which the resins or the resin mixtures used in the surface resin layer (A), the adhesive resin layer (B), the release resin layer (C), and the heat seal resin layer (D) are heated and melted in different extruders, then laminated in a molten state in the order of (A)/(B)/(C)/(D) by a process such as a multi-manifold co-extrusion dice process or a feedblock process, and then formed into a film shape by a process such as blown extrusion or a T die/chill roll process. The coextrusion process is preferred because the ratio of thickness of each layer can be adjusted relatively freely, and hygienic and cost-effective multilayer films can be produced. The T-die/chill roll process is preferred because it is easy to suppress phase separation and gelation of the resins used that can be melted and extruded at relatively high temperatures. The blown extrusion process is preferred because a sealant film can be easily produced inexpensively and in a simple manner.

The sealant film of the present invention is preferably a non-oriented film without being subjected to a special stretching process at the time of production, because if so, suitable secondary formability can be easily achieved.

Surface treatment may also be applied to the surface resin layer (A) in order to improve adhesion with printing inks and lamination suitability when the sealant film is used as a sealant film for laminates. Examples of the surface treatment include corona treatment, plasma treatment, chromic acid treatment, flame treatment, hot air treatment, surface oxidation treatment such as ozone and ultraviolet treatment, or surface roughing treatment such as sandblasting. Corona treatment is preferred.

Laminate Film

It is also preferable that the sealant film of the present invention is laminated with an oriented base film, because if so, the strength to prevent fracture and the heat resistance at the time of heat sealing can be ensured, and the design of printing can be improved. Examples of the oriented base film to be laminated include biaxially oriented polyester films, biaxially oriented nylon films, and biaxially oriented polypropylene films. Biaxially oriented polyester films are more preferred in terms of fracture strength, transparency, and the like. The oriented base film may be subjected to easy-tear processing or antistatic treatment as needed. The method of laminating the sealant film and the oriented base film is not limited, but composite techniques such as dry lamination, extrusion lamination, thermal lamination, and multilayer extrusion coating can be used. Examples of the adhesive used for laminating the sealant film and the oriented base film by the dry lamination process include polyether-polyurethane adhesives and polyester-polyurethane adhesives.

Packaging Material

The sealant film of the present invention or the laminate film of the present invention can be formed into a bag shape with the heat seal resin layer (D) inside and heat-sealed to make a packaging material. There are a variety of forms of the packaging material, such as three-side sealed bags, four-side sealed bags, gusset packaging bags, pillow packaging bags, gable-top bottomed containers, Tetra Classic, brick-type, tube containers, and paper cups.

The sealant film of the present invention or the laminate film of the present invention can also be used as a lid material to seal the opening of a container with the opening to make a packaging container. Examples of the container include cups and trays made of styrene resins, foamed styrene resins, propylene resins, and ester resins by forming methods such as injection molding, vacuum forming, and pressure forming, and paper cups and paper trays made by laminating paper with olefin resins such as polyethylene.

In particular, the sealant film of the present invention and the laminate film of the present invention are best suited for lid materials for sealing the openings of packaging containers with the openings for food products, hygiene products, medical supplies, and the like.

When the sealant film of the present invention is used as a lid material, the adherend surface to which the sealant film is heat-sealed at the opening of the packaging container is preferably mainly composed of an olefin resin such as an ethylene resin. When the heat-sealed surface is mainly composed of an ethylene resin, a suitable seal strength between the opening of the packaging container and the lid material is achieved thereby achieving both hermeticity suitable for protecting the contents and easy open ability, and a release layer that adheres to the adhesive resin layer at the time of resealing can be formed on the opening.

Examples of the ethylene resin used in the packaging container include polyethylene resins such as very low density polyethylene (VLDPE), low density polyethylene (LDPE), linear low density polyethylene (LLDPE), linear medium density polyethylene (LMDPE), and medium density polyethylene (MDPE), and ethylene copolymers such as ethylene-vinyl acetate copolymers (EVA), ethylene-methyl methacrylate copolymers (EMMA), ethylene-ethyl acrylate copolymers (EEA), ethylene-methyl acrylate copolymers (EMA), ethylene-ethyl acrylate-maleic anhydride copolymers (E-EA-MAH), ethylene-acrylic acid copolymers (EAA), and ethylene-methacrylic acid copolymers (EMAA). The packaging container may be a paper packaging material such as a paper cup coated with the ethylene resin or a resin container formed by deep drawing or the like.

The heat-sealed surface at the opening of the packaging container preferably contains the ethylene resin as the main component. The amount of the ethylene resin in the resin constituting the heat-sealed surface is more preferably 60% by mass or more, and even more preferably 80% by mass or more. It is preferable that the amount of the ethylene resin of the heat-sealed surface is within this range, because if so, sufficient seal strength can be achieved.

Any resins may be used in combination with the ethylene resin in the heat-sealed surface as long as they are compatible with the ethylene resin and do not impair the heat seal. Examples thereof include propylene resins such as homopolymers of propylene or copolymers of propylene and α-olefin, such as propylene homopolymers, propylene-ethylene copolymers, propylene-butene-1 copolymers, and propylene-ethylene-butene-1 copolymers.

EXAMPLES

The present invention will be explained in more detail with examples and comparative examples. Hereinafter, "part" and "%" are on the mass basis, unless otherwise specified.

Example 1

The following resins were used as resin components forming the surface resin layer (A), the adhesive resin layer (B), the release resin layer (C), and the heat seal resin layer (D) to prepare resin compositions to form the layers. These resin compositions were fed to extruders for the respective layers, co-extruded by a T-die/chill roll process at a T-die temperature of 250° C., and then cooled with a water-cooled metal cooling roll at 40° C. to produce a laminated film with a four-layer structure of surface resin layer (A)/adhesive resin layer (B)/release resin layer (C)/heat seal resin layer (D), in which the thickness of each layer was 12 μm/12 μm/3 μm/3 μm, and the total thickness of the film was 30 μm. The surface resin layer (A) of the resulting laminated film was subjected to corona discharge treatment so that the wetting tension was 40 mN/m.

Surface resin layer (A): 100 parts by mass of linear low density polyethylene (density: 0.93 g/cm³, MFR: 4.0 g/10 min) (hereinafter referred to as LLDPE (1)).

Adhesive resin layer (B): 50 parts by mass of a styrene elastomer (MFR: 8.0 g/10 min) (hereinafter referred to as styrene elastomer (1)) and 50 parts by mass of a tackifier resin (softening temperature: 110° C.) (hereinafter referred to as tackifier resin (1)).

Release resin layer (C): 75 parts of a metal-neutralized ethylene-methacrylic acid copolymer with a methacrylic acid-derived component content of 6.8 mol % (MFR: 16.0 g/10 min) (hereinafter referred to as EMAA (1)) and 25 parts of a metal-neutralized ethylene-methacrylic acid copolymer (EMAA) with a methacrylic acid-derived component content of 4.8 mol % (MFR: 6.0 g/10 min) (hereinafter referred to as EMAA (2)).

Heat seal layer (D): 100 parts by mass of low density polyethylene (density: 0.92 g/cm³, MFR: 35 g/10 min) (hereinafter referred to as polyethylene resin (1)).

Example 2

The multilayer film was produced in the same manner as in Example 1, except that the resin component used for the heat seal resin layer (D) was as follows.

Heat seal resin layer (D): 100 parts by mass of low density polyethylene (density: 0.92 g/cm³, MFR: 7 g/10 min) (hereinafter referred to as polyethylene resin (2)).

Example 3

The multilayer film was produced in the same manner as in Example 1, except that the resin component used for the heat seal resin layer (D) was as follows.

Heat seal resin layer (D): 80 parts by mass of the polyethylene resin (1) and 20 parts by mass of the ethylene-butadiene rubber (density: 0.89 g/cm³, MFR: 18.0 g/10 min) (hereinafter referred to as ethylene elastomer (1)).

Example 4

The multilayer film was produced in the same manner as in Example 1, except that the resin component used for the heat seal resin layer (D) was as follows.

Heat seal resin layer (D): 50 parts by mass of the polyethylene resin (1) and 50 parts by mass of the ethylene elastomer (1).

Example 5

The multilayer film was produced in the same manner as in Example 1, except that the resin component used for the heat seal resin layer (D) was as follows.

Heat seal resin layer (D): 35 parts by mass of the polyethylene resin (1) and 65 parts by mass of the ethylene elastomer (1)

Example 6

The multilayer film was produced in the same manner as in Example 1, except that the resin component used for the heat seal resin layer (D) was as follows.

Heat seal resin layer (D): 20 parts by mass of the polyethylene resin (1) and 80 parts by mass of the ethylene elastomer (1).

Example 7

The multilayer film was produced in the same manner as in Example 1, except that the resin component used for the release resin layer (C) was as follows.

Release resin layer (C): 100 parts by mass of EMAA (1).

Example 8

The multilayer film was produced in the same manner as in Example 1, except that the resin component used for the release resin layer (C) was as follows.

Release resin layer (C): 50 parts by mass of EMAA (1) and 50 parts by mass of EMAA (2).

Example 9

The multilayer film was produced in the same manner as in Example 1, except that the resin component used for the heat seal resin layer (D) was as follows.

Heat seal resin layer (D): 50 parts by mass of the polyethylene resin (1) and 50 parts by mass of the polyethylene resin (2).

Comparative Example 1

The multilayer film was produced in the same manner as in Example 1, except that the resin component used for the release resin layer (C) was as follows.

Release resin layer (C): 100 parts by mass of EMAA (2).

Comparative Example 2

The multilayer film was produced in the same manner as in Example 1, except that the resin component used for the release resin layer (C) was as follows.

Release resin layer (C): 25 parts by mass of EMAA (1) and 75 parts by mass of EMAA (2).

Comparative Example 3

The multilayer film was produced in the same manner as in Example 1, except that the resin component used for the heat seal resin layer (D) was as follows.

Heat seal resin layer (D): 100 parts by mass of a polypropylene homopolymer using a metallocene catalyst (density: 0.9 g/cm³, MFR: 7.0 g/10 min) (hereinafter referred to as polypropylene resin (1)).

Comparative Example 4

The multilayer film was produced in the same manner as in Example 1, except that the resin component used for the release resin layer (C) was as follows.

Release resin layer (C): 100 parts by mass of an amorphous polyester resin (PETG 6763 from Eastman Chemical Company, density 1.27 g/cm³).

The following evaluations were performed on the multilayer films obtained in the above examples and comparative examples. The results are listed in Tables 1 and 2.

Preparation of Laminate Film

A biaxially oriented polyethylene terephthalate (PET) film (12 μm thick) was bonded by dry lamination to a surface of the surface resin layer (A) of each of the multilayer films obtained in the above examples and comparative examples and aged at 40° C. for 36 hours to produce a laminate film for evaluation. In this case, a two-component curable adhesive (a polyester adhesive "DICDRY LX500" and a curing agent "DICDRY KR-90S") available from DIC Corporation was used as the adhesive for dry lamination.

Haze

The cloudiness (haze) of the films obtained in the examples and comparative examples was measured using a haze meter (from NIPPON DENSHOKU INDUSTRIES Co., Ltd.) based on JIS K7105 (unit: %).

Initial Seal Strength

The surface of the heat seal resin layer (D) of the resulting laminate film was superimposed on polyethylene laminate paper and heat-sealed at a heat seal temperature of 140° C. and a seal pressure of 0.2 MPa for a seal time of 1 second. Subsequently, the heat-sealed film was cooled naturally at 23° C. for 24 hours and cut into a 15 mm wide strip as a test piece. This test piece was subjected to a 180° peel test at a speed of 300 ram/min using a tensile tester (from A&D Company, Limited) in a thermostatic chamber at 23° C. and 50% RH to measure the heat seal strength (initial seal strength).

Evaluation of Exposure State of Adhesive Resin Layer After Peeling

In the test piece of which heat seal strength was measured, the appearance of the laminate film after peeling was checked and evaluated according to the following criteria.

A: The percentage of exposure of the adhesive resin layer at the peeled surface is 80% or more.

B: The percentage of exposure of the adhesive resin layer at the peeled surface is 50% or more and less than 80%.

C: The percentage of exposure of the adhesive resin layer at the peeled surface is 30% or more and less than 50%.

D: The percentage of exposure of the adhesive resin layer at the peeled surface is less than 30%.

Resealability

The test piece of which heat seal strength was measured was pressure-bonded again at 23° C. and 0.2 MPa for 1 second and then left in a thermostatic chamber at 23° C. and 50% RH for 5 minutes. The test piece was then subjected to a 180° peel test at a speed of 300 ram/min using a tensile tester (from A&D Company, Limited) to measure the seal strength (that is, seal strength after resealing). The seal strength was evaluated based on the following criteria.

A: The seal strength after resealing is 3 N/15 mm or more.

B: The seal strength after resealing is 2 N/15 mm or more and 3 N/15 mm or less.

D: The seal strength after resealing is less than 2 N/15 mm.

TABLE 1

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| Surface resin layer (A) |  | LLDPE (1) | 100 | 100 | 100 | 100 | 100 | 100 | 100 | 100 | 100 |
| Adhesive resin layer (B) | b1 | Styrene elastomer (1) | 50 | 50 | 50 | 50 | 50 | 50 | 50 | 50 | 50 |
|  | b2 | Tackifier resin (1) | 50 | 50 | 50 | 50 | 50 | 50 | 50 | 50 | 50 |
| Release resin layer (C) | c1 | EMAA (1) | 75 | 75 | 75 | 75 | 75 | 75 | 100 | 50 | 75 |
|  | c2 | EMAA (2) | 25 | 25 | 25 | 25 | 25 | 25 |  | 50 | 25 |
|  |  | Polyester resin (1) |  |  |  |  |  |  |  |  |  |
| Heat seal resin layer (D) | d1 | Polyethylene resin (1) | 100 |  | 80 | 50 | 35 | 20 | 100 | 100 | 50 |
|  |  | Polyethylene resin (2) |  | 100 |  |  |  |  |  |  | 50 |
|  | d2 | Ethylene elastomer (1) |  |  | 20 | 50 | 65 | 80 |  |  |  |
|  |  | Polypropylene resin (1) |  |  |  |  |  |  |  |  |  |
| [((Wc2/Wet) × 100) + ((Wd2/Wdt) × 100)]/2 |  |  | 12.5 | 12.5 | 22.5 | 37.5 | 45 | 52.5 | 0 | 25 | 12.5 |
| Total thickness of film [μm] |  |  | 30 | 30 | 30 | 30 | 30 | 30 | 30 | 30 | 30 |
| Haze [%] |  |  | 15 | 15 | 15 | 16 | 17 | 18 | 14 | 15 | 15 |
| Initial seal strength [N/15 mm] |  |  | 10 | 12 | 11 | 10 | 11 | 11 | 10 | 9 | 12 |

TABLE 1-continued

|  | Example 1 | Example 2 | Example 3 | Example 4 | Example 5 | Example 6 | Example 7 | Example 8 | Example 9 |
|---|---|---|---|---|---|---|---|---|---|
| Adhesive layer exposure | A | A | A | A | A | B | B | B | A |
| Resealability | A | A | A | A | A | A | A | B | A |

TABLE 2

|  |  |  | Comparative Example 1 | Comparative Example 2 | Comparative Example 3 | Comparative Example 4 |
|---|---|---|---|---|---|---|
| Surface resin layer (A) |  | LLDPE (1) | 100 | 100 | 100 | 100 |
| Adhesive resin layer (B) | b1 | Styrene elastomer (1) | 50 | 50 | 50 | 50 |
|  | b2 | Tackifier resin (1) | 50 | 50 | 50 | 50 |
| Release resin layer (C) | c1 | EMAA (1) |  | 25 | 75 |  |
|  | c2 | EMAA (2) | 100 | 75 | 25 |  |
|  |  | Polyester resin (1) |  |  |  | 100 |
| Heat seal resin layer (D) | d1 | Polyethylene resin (1) | 100 | 100 |  | 100 |
|  |  | Polyethylene resin (2) |  |  |  |  |
|  | d2 | Ethylene elastomer (1) |  |  |  |  |
|  |  | Polypropylene resin (1) |  |  | 100 |  |
| $[((Wc2/Wct) \times 100) + ((Wd2/Wdt) \times 100)]/2$ |  |  | 50 | 37.5 | 12.5 | 0 |
| Total thickness of film [μm] |  |  | 30 | 30 | 30 | 30 |
| Haze [%] |  |  | 17 | 17 | 15 | 15 |
| Initial seal strength [N/15 mm] |  |  | 9 | 8 | — | 9 |
| Adhesive layer exposure |  |  | A | A | D | D |
| Resealability |  |  | D | D | — | — |

As is clear from the tables above, the laminated films of the present invention in Examples 1 to 11 had suitable initial heat sealability to the adherend and easy open ability, had the adhesive surface exposed well when peeled off, and can achieve stable resealability.

On the other hand, Comparative Example 1 did not contain a high polar ionomer, resulting in poor resealability. Comparative Example 2 had a small amount of a high polar ionomer, resulting in poor resealability. Comparative Example 3 did not contain the polyethylene resin (d1) in the heat seal layer (D) and therefore failed to be sealed on the base. Comparative Example 4 did not contain the ethylene ionomer (c1) in the release resin layer and therefore failed to peel between the adhesive resin layer (B) and the release resin layer (C) and failed to reseal.

What is claimed is:

1. A sealant film comprising a surface resin layer (A), an adhesive resin layer (B), a release resin layer (C), and a heat seal resin layer (D) that are laminated, wherein
   the adhesive resin layer (B) contains a thermoplastic elastomer (b1) and a tackifier resin (b2),
   the release resin layer (C) contains 40% by mass or more of an ethylene ionomer (c1) with a polar group concentration exceeding 5.5 mol % in a resin component contained in the release resin layer (C),
   the release resin layer (C) further contains 0 to 60% by mass of an ethylene ionomer (c2) with a polar group concentration of 5.5 mol % or less in the resin component contained in the release resin layer (C), and
   the heat seal resin layer (D) contains an ethylene resin (d1).

2. The sealant film according to claim 1, wherein
   the heat seal resin layer (D) contains 0 to 80% by mass of a thermoplastic elastomer (d2) in a resin component contained in the heat seal resin layer (D), and
   a percentage of the ethylene ionomer (c2) and the thermoplastic elastomer (d2) as expressed by the following formula is 10 to 60%:

$$[((Wc2/Wct) \times 100) + ((Wd2/Wdt) \times 100)]/2$$

where Wct is a total amount (mass) of the resin component contained in the release resin layer (C),
Wc2 is an amount (mass) of the ethylene ionomer (c2) in the resin component contained in the release resin layer (C),
Wdt is a total amount (mass) of the resin component contained in the heat seal resin layer (D), and
Wd2 is an amount (mass) of the thermoplastic elastomer (d2) in the resin component contained in the heat seal resin layer (D).

3. The sealant film according to claim 1, wherein the thermoplastic elastomer (b1) contained in the adhesive resin layer (B) is at least one selected from styrene elastomers, ethylene elastomers, and propylene elastomers.

4. The sealant film according to claim 1, wherein the surface resin layer (A) is a resin layer containing an olefin resin as a main resin component.

5. The sealant film according to claim 1, wherein the sealant film is resealable after peeled at an interface between the adhesive resin layer (B) and the release resin layer (C).

6. The sealant film according to claim 1, wherein a seal strength after resealing that is measured after the sealant film is heat-sealed and then peeled, pressure-bonded again at 23° C. and 0.2 MPa for a sealing time of 1 second, and then left for 5 minutes at 23° C. and 50% RH is 2 N/15 mm or more.

7. The sealant film according to claim 1, wherein the film has a total thickness of 10 to 100 μm.

8. A laminate film comprising the sealant film according to claim 1.

9. A packaging material comprising the sealant film according to claim 1.

10. The packaging material according to claim 9, wherein the packaging material is used for sealing an opening of a container having the opening mainly composed of an ethylene resin.

* * * * *